United States Patent Office.

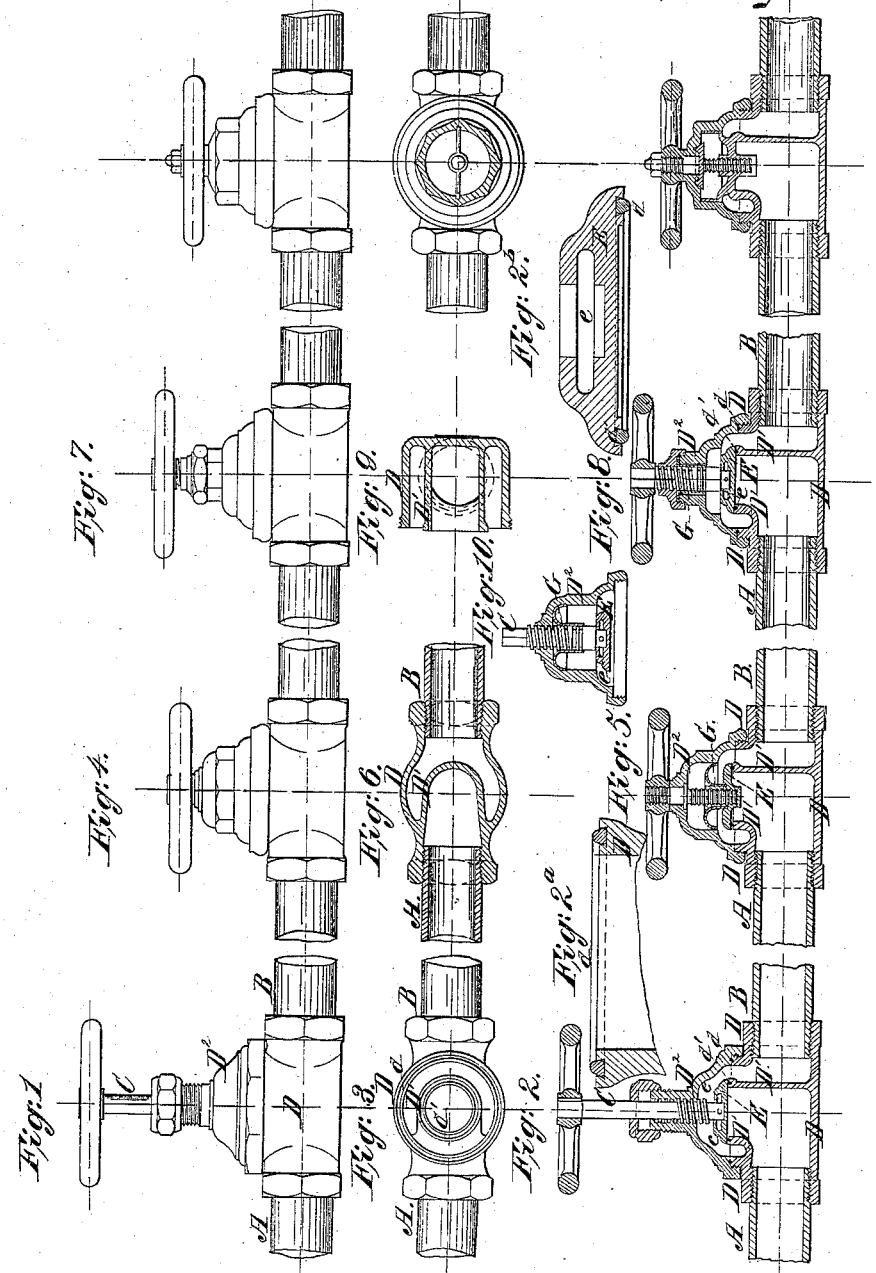

RALPH G. PACKARD, OF BROOKLYN, NEW YORK.

Letters Patent No. 79,679, dated July 7, 1868.

---

IMPROVEMENT IN GLOBE-VALVES.

---

*The Schedule referred to in these Letters Patent and making part of the same.*

---

TO ALL WHOM IT MAY CONCERN:

Be it known that I, RALPH G. PACKARD, of Brooklyn, in the county of Kings, and State of New York, have invented certain new and useful Improvements in Stop-Valves for steam and other fluids; and I do hereby declare that the following is a full and exact description thereof.

I will first describe what I consider the best means of carrying out my invention, and will afterwards designate the points which I believe to be new.

The accompanying drawings form a part of this specification.

Figure 1 is a side elevation, and

Figure 2 is a central vertical section of the valve, containing some of the important features of my invention.

Figure 3 is a plan view of the same, with the upper portions removed.

Figure 4 is a side elevation,

Figure 5 is a vertical section, and

Figure 6 a horizontal section of a modification, showing other features of my invention.

Figure 7 is a side elevation, and

Figure 8 a vertical section of another form.

Figure 9 is a cross-section of the lower portion of the valve.

Figure 10 is a vertical section through the upper portion, showing some of the parts still further modified.

Figure $2^a$ shows on a larger scale a cross-section of the valve-seat. It shows the dove-tailing of the recess in which the soft wire forming the ridge is retained.

Figure $2^b$ shows a similar provision for holding the soft ridge on the upper instead of the lower surface. It is preferable, generally, to put it on the lower surface, and it will hereafter be so described.

Similar letters of reference indicate corresponding parts in all the figures.

A and B are lengths of pipe, between which my valve is introduced. The steam or other fluid flows from A into B through the valve, and is controlled thereby. C is the stem, by turning which in one direction or the other the flow is increased or diminished, or stopped altogether.

D is the exterior casing, and $D^1$ is an interior casing, which rises at its upper edge a little above the upper edge of the exterior casing D. The interior casing is so arranged relatively to the exterior that there is a clear annular passage quite around the top, between the one and the other.

E is the valve proper. Its lower face applies upon the upper edge of the interior casing, $D^1$, or, rather, upon a soft surface, connected as will be presently described. It is mounted on the lower end of the stem C, and is free to turn therewith or not, as circumstances may determine.

$D^2$ is the casing for the top. It is fitted upon the upper edge of the casing D, as represented, and is provided with an internal thread, which receives the male thread on the stem C, as represented, as also with a stuffing-box at the top, which encloses the stem in the ordinary manner.

The joint between the top $D^2$ and the main exterior casing D is made tight, in a manner well known to engineers, by sinking a wire, of copper or of like soft material, partially into one part and partially into the other, as designated at $d$.

The joint between the lower face of the valve E and the upper edge of the internal casing $D^1$ is made tight, in a manner somewhat analogous. A ridge of soft material, $d'$, rises above the plane face of the upper edge of the internal casing $D^1$, and is partially crushed down by the contact of the valve E. This ridge may be formed by making the interior casing $D^1$ of soft brass, and turning a quite narrow ridge, to extend up in the position indicated by $d'$, or the main parts may be made of hard brass, cast iron, or other hard material, and a soft copper wire may be partially sunk and locked in the upper edge of the internal casing $D^1$, so that its upper surface may project, as shown on a larger scale in section in fig. $2^a$. In case this latter arrangement is adopted, it is important that the groove in which the soft wire is sunk be undercut a little, so that, on the partially crushing of the wire by use, the soft material shall be firmly locked therein, and not, as in the ordinary joint, $d$, be free to jump out by any slight force when the covering-piece is lifted.

The union of the stem C with the valve E is formed as follows: A cavity is cored in the valve E, as indicated by e. The stem C is inserted in the manner represented, and a pin, c, is driven, or (better still) is tapped through the lower end of the stem, by introducing it through a hole in the valve E, not represented. This pin c is of such length that it projects on each side, and the cored cavity e is of sufficient size to allow the projecting ends to revolve freely therein. It follows that the valve E is free to turn with the stem C, or to rest on the soft material below, without turning, and to allow the valve-stem C to turn around within it. In practice, the valve E usually turns with the stem when it is lifted clear of its seat, and sits quietly without turning during the act of tightening and slackening of the valve after it has come in contact with its seat. It is compelled by the pin c to rise when the screw C is raised.

Referring to fig. 5, G represents a packing-piece, of brass or other suitable material, spun into the form represented, and attached to the valve by soldering or otherwise, so that it rises and sinks therewith. In the representation of this modification of the valve, some of the other features of the invention are omitted. The union of the stem C with the valve is formed by screw-threads, in the ordinary manner.

With this arrangement, it is important that the valve be held so that it cannot turn. The piece may be made to accomplish this by making it six-sided, eight-sided, or square, or of any other angular form, and making the chamber above, in which it rises and sinks, correspondingly formed.

When there is no pressure of steam or other fluid on the packing-piece G, its contact with the interior of the casing $D^2$ may be very slight, but when the pressure is thrown upon it, the form is such that it slightly expands, and fits steam-tight. This arrangement avoids the necessity for any stuffing-box at the top, and allows the valve to operate successfully with much less height than is required with the form first represented. I find there is sufficient friction to prevent its turning when the piece G is round.

Referring to fig. 8, G represents the packing-piece as confined to the top of the casing instead of to the valve, the valve being of the form and operating under the conditions first described. This form of the part G is made steam-tight by the pressure of the steam itself, but in this case the pressure forces the free edge against the stem C, and not against the casing $D^2$. The operation is the same, as will be readily observed, but the height required for the valve-stem is a little greater.

Referring to fig. 10, the form and arrangement of the packing-piece G here delineated is such, that the pressure of the steam induces a pressure both against the interior of the top casing $D^2$, and also against the stem C.

I attach much importance to the peculiar construction and arrangement of the internal casing $D^1$ relatively to the other parts. It will be observed that so soon as the disk or valve proper, E, is lifted from its soft ridge $d'$, the steam is allowed to escape equally in all directions, and that, on so escaping, it has a free passage to the pipe B, by flowing down in the annular space provided quite around the valve-seat. As valves of this character have been heretofore constructed, the steam can flow down in this manner only on one side. On the other side it is required to rise up, and flow across over the top of the valve. My invention necessitates a much less space over the top of the valve. In fact, I can run the valve clear up hard against the interior of the casing $D^2$, and still my valve will practically discharge with equal freedom in every direction.

I also attach much importance to the fact that the valve-seat on the upper edge of the internal casing $D^1$ is above the upper edge of the external casing D. It allows me, when the top casing $D^2$, and its connections, are removed, to plane, file, scrape, or otherwise finish or repair, the surfaces where the valve E must bear with much greater freedom than in the ordinary construction of such valves.

The advantages due to the soft ridge $d'$ will, I believe, be apparent on inspection. So also will be the advantages of my packing-piece G, with either or all its special modifications, and my mode of connecting the stem C to the valve proper. This last may require a single remark, to wit, that when the valve-stem is fixed firmly and immovably to the valve, the necessity for turning the valve around after it has touched at C, induces so great a friction, that the joint is less easily made tight than when, as in this case, the valve is free to rise, and allow the stem to return within it. My union is very simple and durable, and is very easily and cheaply made.

I will add a word about the peculiar advantages of the soft ridge d. There have been soft beds adapted to receive a hard ridge, and thus to make a tight and self-adjusting bearing, but such construction would not answer where the valve is liable to move laterally. But my soft ridge will allow all the movement of the valve laterally which is ever required, in consequence of the looseness of the connection, want of concentricity of the screw C, or other cause. And it will be readily understood that the desired effect will be equally attained by the soft projecting ridge d, if it be fixed on the upper as on the lower part; that is to say, it may be carried on the lower face of the valve E, and may be crushed against the plane face of the seat $D^1$ with the same effect as when fixed on the face of the seat, and crushed against the part E.

Having now fully described my invention, what I claim as new therein, and desire to secure by Letters Patent, is as follows:

1. I claim the within-described mode of connecting the valve proper with the valve-stem C, that is to say, by the employment of the pin c and cavity e, arranged relatively to each other, and to the other parts, substantially as and for the purpose herein specified.

2. I claim the elastic packing-piece G, arranged, as represented, relatively to the stem C and top casing $D^2$, to prevent the escape of steam or other fluid around the stem C, being packed or fitted with increased tightness in proportion as the pressure of the fluid is increased, substantially as and for the purposes herein specified.

RALPH G. PACKARD.

Witnesses:
W. C. DEY,
C. C. LIVINGS.